(12) United States Patent
Cooper et al.

(10) Patent No.: US 9,963,059 B2
(45) Date of Patent: May 8, 2018

(54) SELF-ADJUSTING CUP HOLDER ASSEMBLY

(71) Applicant: FORD GLOBAL TECHNOLOGIES, LLC, Dearborn, MI (US)

(72) Inventors: Geoffrey John Cooper, Canton, MI (US); Hossein Jacob Sadri, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 14/971,714

(22) Filed: Dec. 16, 2015

(65) Prior Publication Data

US 2017/0174110 A1    Jun. 22, 2017

(51) Int. Cl.
*B60N 3/10* (2006.01)

(52) U.S. Cl.
CPC ............. *B60N 3/108* (2013.01); *B60N 3/106* (2013.01)

(58) Field of Classification Search
CPC ............................... B60N 3/108; B60N 3/106
USPC ......................................................... 220/737
See application file for complete search history.

(56) References Cited

U.S. PATENT DOCUMENTS

| | | | |
|---|---|---|---|
| 1,397,323 A | 11/1921 | Mitchell | |
| 5,154,380 A | 10/1992 | Risca | |
| 5,791,618 A | 8/1998 | Lancaster | |
| 5,800,011 A | 9/1998 | Spykerman | |
| 6,637,709 B1 | 10/2003 | Guenther et al. | |
| 7,036,784 B2 | 5/2006 | Peitzmeier et al. | |
| 7,165,752 B2 | 1/2007 | Dobos | |
| 7,416,161 B2 | 8/2008 | Shin | |
| 7,487,945 B2 | 2/2009 | Liu et al. | |
| 8,672,176 B2 | 3/2014 | Sayasithsena | |
| 8,733,724 B2 | 5/2014 | Voigt et al. | |
| 2007/0221804 A1* | 9/2007 | Harshman | B60N 3/106 248/311.2 |
| 2011/0297717 A1* | 12/2011 | Kaemmer | B60N 3/108 224/567 |
| 2014/0158848 A1* | 6/2014 | Caruso | B60N 3/106 248/311.2 |

FOREIGN PATENT DOCUMENTS

| | | |
|---|---|---|
| EP | 1462305 A2 | 9/2004 |
| JP | 3137651 U | 12/2007 |

OTHER PUBLICATIONS

English machine translation of EP1462305A2.
English machine translation of JP3137651U.

* cited by examiner

*Primary Examiner* — Steven A. Reynolds
*Assistant Examiner* — Mollie Impink
(74) *Attorney, Agent, or Firm* — Vichit Chea; King & Schickli, PLLC

(57) ABSTRACT

A self-adjusting cup holder assembly includes a housing having an open cavity and a flexible well held in that cavity. The flexible well is displaceable between a rest position and cup holding position whereby the cup is squeezed by the flexible well and positively maintained in the well by a positive gripping force.

14 Claims, 5 Drawing Sheets

SELF-ADJUSTING CUP HOLDER ASSEMBLY

TECHNICAL FIELD

This document relates generally to the motor vehicle equipment field and, more particularly, to a self-adjusting cup holder assembly that will automatically adjust to squeeze and positively grip various shapes and sizes of cups.

BACKGROUND

It has long been known to equip motor vehicles with cup holders in the center console or at other convenient locations. Current cup holder designs generally include rigid cup wells sized to accommodate the most common sizes and shapes of cups. Some of those wells are equipped with resilient fingers within the well that are adapted to grip a sidewall of a cup.

As a result of design limitations characteristic of rigid cup wells, tall, narrow cups may not be properly supported and may tip and spill during spirited driving or when driving on rough roadways. In contrast, wider cups may be overconstrained by the rigid well wall resulting in the possibility of the operator spilling the contents when the cup is removed or retracted from the cup holder in an uncontrollable jerky motion. Further, current cup holders generally do not include a complete lining to catch spills while being easily removed for cleaning.

This document relates to a self-adjusting cup holder assembly that will accommodate and properly hold a wider range of shapes and sizes of cups. The new cup holder assembly includes a flexible well that not only catches spills but is easily removed for cleaning. As such, the self-adjusting cup holder assembly disclosed herein represents a significant advance in the art.

SUMMARY

In accordance with the purposes and benefits described herein, a self-adjusting cup holder assembly is provided. That cup holder assembly includes a housing having an open cavity and a flexible well is held in that cavity. The flexible well is displaceable between a rest position and a cup holding position. The flexible well may include an integral spring. Further, the flexible well may include a closed end for retaining spills.

In some embodiments, the housing includes a receiver. An end to the integral spring is held in the receiver. Still further, in some embodiments the receiver extends around the open cavity. In one possible embodiment, the open cavity has a circular opening and the receiver is a channel extending concentrically around that circular opening.

In one possible embodiment, the integral spring includes a first end held in the receiver at a first point and a second end held in the receiver at a second point. Further, the integral spring includes an intermediate section extending along a bottom of the flexible well.

Still further the integral spring includes a first hinge point between the first end and the intermediate section and a second hinge point between the intermediate section and the second end. In one possible embodiment, the first hinge point is opposed to the second hinge point and a cup is positively squeezed between the first hinge point and the second hinge point when that cup is pressed down into the well.

Still further, in one possible embodiment, the integral spring includes a first arcuate section between the first end and the first hinge point. Further, the integral spring includes a second arcuate section between the second end and the second hinge point. In addition, a gap is provided between the bottom of the flexible well and the bottom wall of the open cavity.

In the following description, there are shown and described several preferred embodiments of the self-adjusting cup holder assembly. As it should be realized, the self-adjusting cup holder assembly is capable of other, different embodiments and its several details are capable of modification in various, obvious aspects all without departing from the self-adjusting cup holder assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the self-adjusting cup holder assembly and together with the description serve to explain certain principles thereof. In the drawing figures.

Figure 1:
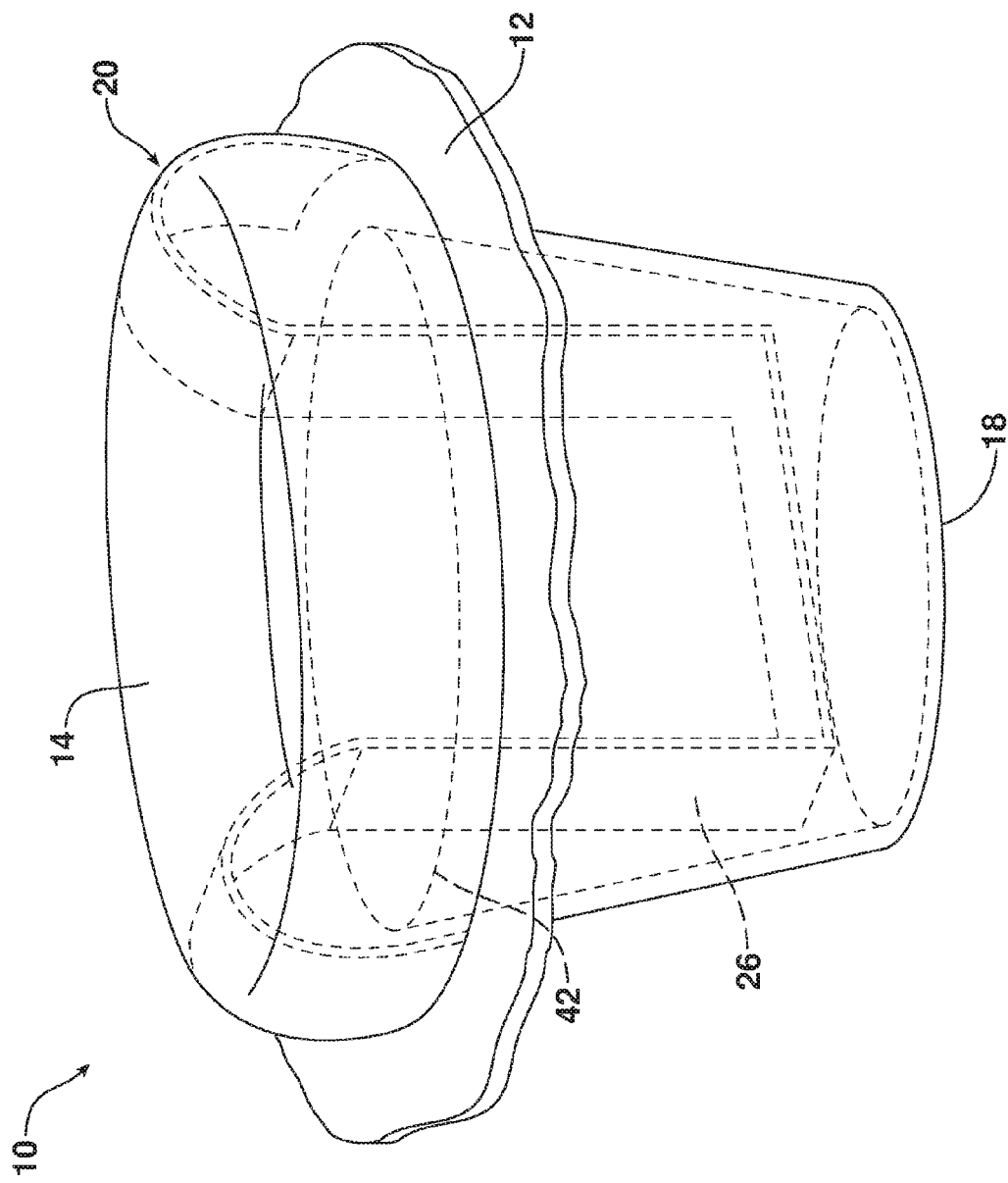
FIG. 1 is a perspective view of the self-adjusting cup holder assembly provided as part of the center console of a motor vehicle.

Reference will now be made in detail to the present preferred embodiments of the self-adjusting cup holder assembly, examples of which are illustrated in the accompanying drawing figures.

DETAILED DESCRIPTION

Reference is now made to FIGS. 1-5 illustrating the self-adjusting cup holder assembly 10. The self-adjusting cup holder assembly 10 includes a housing 12 and a flexible well 14. As illustrated, the housing 12 includes an open cavity 16 having a bottom wall 18. The flexible well 14 is held in the cavity 16 and as will be described in greater detail below, is displaceable between a rest position illustrated in full line in FIG. 4 and a cup holding position illustrated in phantom line in FIG. 4.

Figure 2:
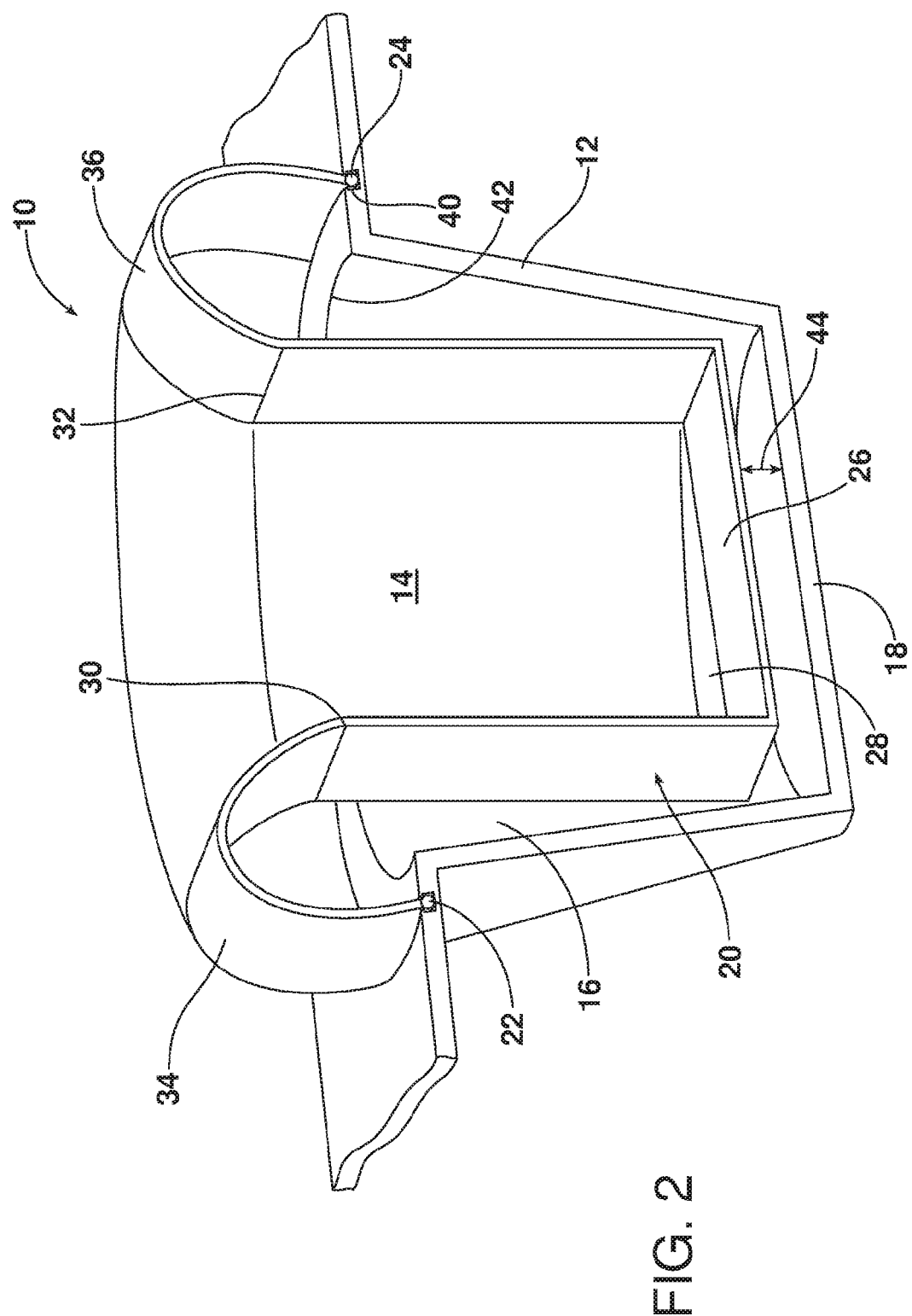
FIG. 2 is a perspective sectional schematic view through the cup holder assembly to illustrate the flexible well and integral spring.
Figure 3:
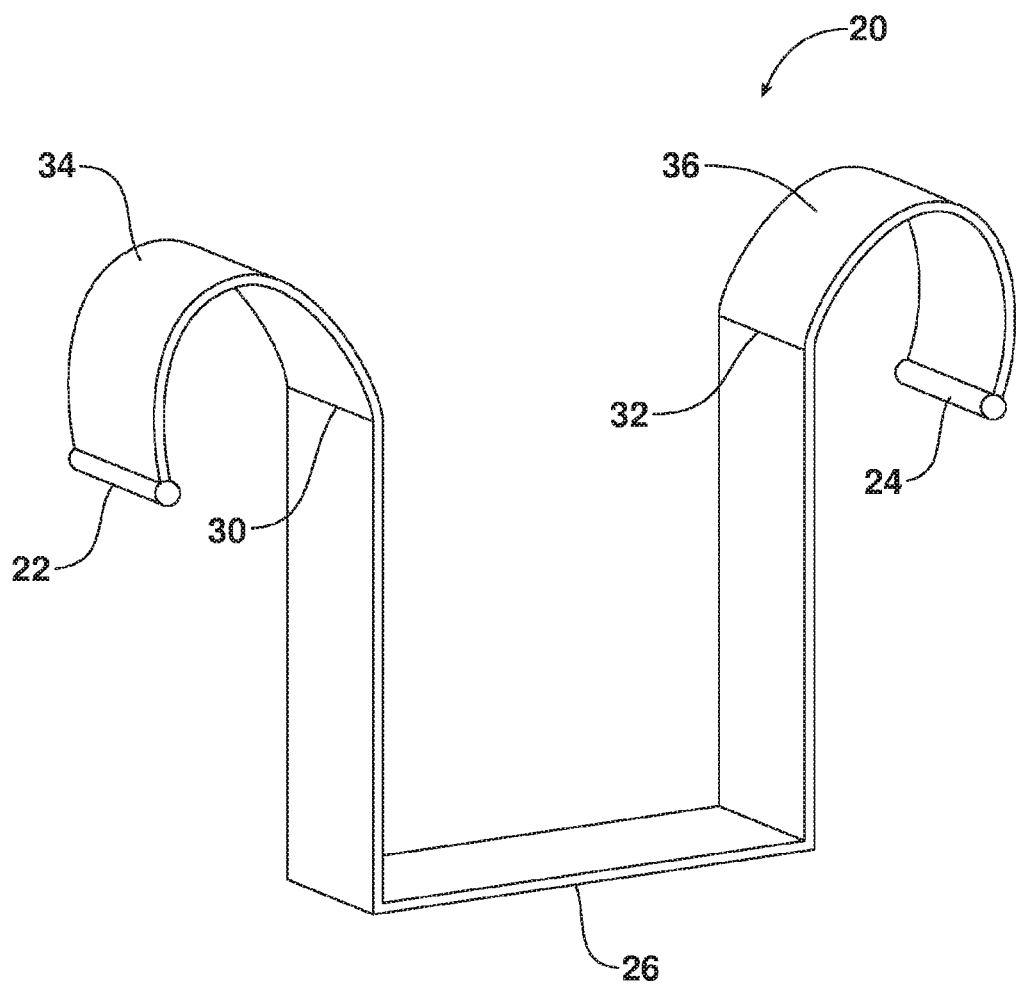
FIG. 3 is a detailed perspective view of the integral spring to illustrate its structure.

The flexible well 14 includes an integral spring, generally identified by reference numeral 20, shown in FIG. 2 and illustrated in detail in FIG. 3. As shown in FIG. 3, the integral spring 20 includes a first end 22 and a second, opposite end 24. Further, the integral spring 20 includes a U-shaped intermediate section 26 that extends along a bottom 28 and up the side of the flexible well 14 (see also FIG. 2). A first hinge point 30 is provided between the first end 22 and the intermediate section 26. Further the integral spring 20 includes a second hinge point 32 provided between the intermediate section 26 and the second end 24.

As further in FIG. 3, the integral spring 20 includes a first arcuate section 34 between the first end 22 and the first hinge point 30 and a second arcuate section 36 between the second end 24 and the second hinge point 32.

The integral spring 20 may be molded directly into the flexible well 14. The performance of the spring 20 may be controlled by spring geometry including, but not necessarily limited to, material thickness (including varying thicknesses), material type, integral spring width, integral spring shape, the position and geometry of the hinge points 30, 32 as well as the pivot points that will be described in greater detail below.

In the illustrated embodiment, the flexible well 14 includes a single integral spring 20. It should be appreciated, however, that the flexible well 14 may include more than one such integral spring 20 or even an integral spring of other shape/design.

As illustrated in FIG. 2, the housing 12 also includes a receiver 40. In the illustrated embodiment, the open cavity 16 in the housing 12 includes a circular opening 42 and the receiver 40 is concentrically positioned around that circular opening. The terminal end of the flexible well 14 including the first and second ends 22, 24 of the integral spring 20 are received and held in the receiver 40.

In the illustrated embodiment, the terminal end of the flexible well 14 and the first and second ends 22, 24 of the integral spring 20 snap into the receiver 40 which takes the form of a small channel. As a result, the first end 22 of the integral spring 20 forms a first pivot point opposed to the second end 24 of the integral spring that forms a second pivot point. As also illustrated in FIG. 2, a gap 44 is provided between the bottom 28 of the well 14 and the bottom wall 18 of the cavity 16. This gap 44 provides the necessary clearance to allow the flexible well 14 to be displaced between the rest position illustrated in full line in FIG. 4 and the cup holding position illustrated in phantom line in FIG. 4.

Figure 4:
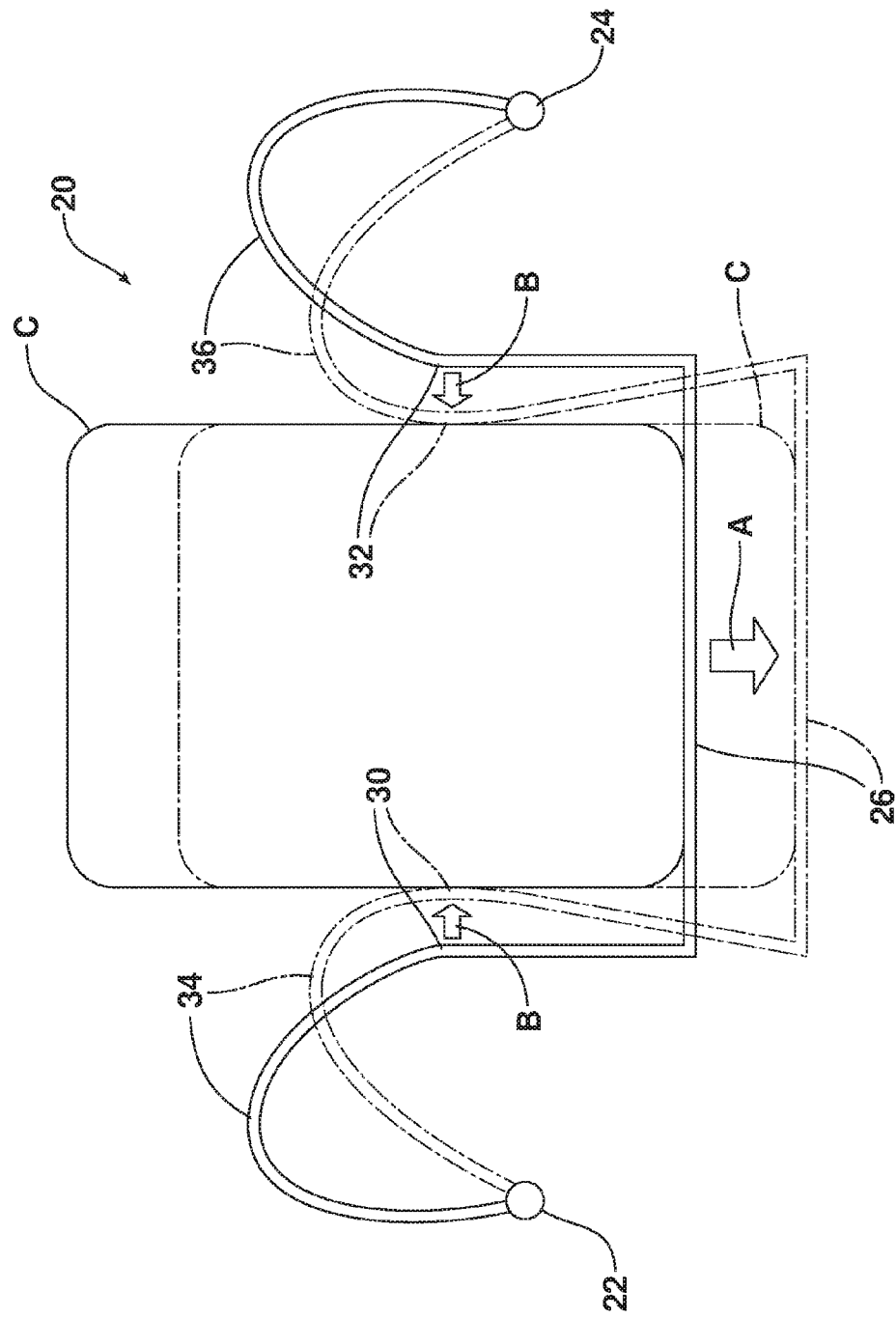
FIG. 4 is a schematic illustration of the operation of the self-adjusting cup holder assembly showing how the flexible well, through the operation of the integral spring, positively engages and retains a cup pushed down into the flexible well.

As illustrated in FIG. 4, when a cup C is placed inside the flexible well 14 and pressed downwardly against the bottom 28, the well 14 is displaced downward (note action arrow A). This downward motion pulls the opposed hinge points 30, 32 inwardly toward each other (note action arrows B) so that the hinge points function as gripping fingers against the side of the cup C. Advantageously, the hinge points/gripping fingers 30, 32 are stiff enough to hold the cup C in a light grip yet flexible enough to not over-squeeze the cup. This gripping force is adjustable by tuning the flexible well 14 and the integral spring 20 as described above.

Advantageously, the cup C may also be easily removed from the flexible well 14. More specifically, when the cup C is removed, the upward motion of the cup C provides the necessary clearance to allow the flexible well 14 to return to its rest position under the biasing force of the spring 20. More specifically, the well 14 pivots about the pivot points at the intersection of the first and second ends 22, 24 of the integral spring 20 with the receiver 40, causing the flexible well 14 to rise in the cavity 16 and the hinge points 30, 32 to spread away from the cup C back to the original or rest position (illustrated in full line in FIG. 4) thereby allowing unrestricted movement of the cup.

From the above description, it should be appreciated that the further the cup C is inserted into the open cavity 16, the further the flexible well 14 is displaced downward and the further the hinge points 30, 32 are brought together to grip the sides of the cup C to secure the cup in the cup holder assembly 10. However, when the cup C is lifted from the cup holder assembly 10, the integral spring 20 biases the flexible well 14 back to its original rest position, spreading the hinge points 30, 32 and moving them away from the sides of the cup C so as to allow the user to remove the cup in an unrestricted manner without any jerky motion that might result in an inadvertent spill. Toward this goal, the hinge points/gripping fingers 30, 32 include smooth cup contacting surfaces to allow smooth sliding action between the cup C and the hinge points/gripping fingers.

Figure 5:
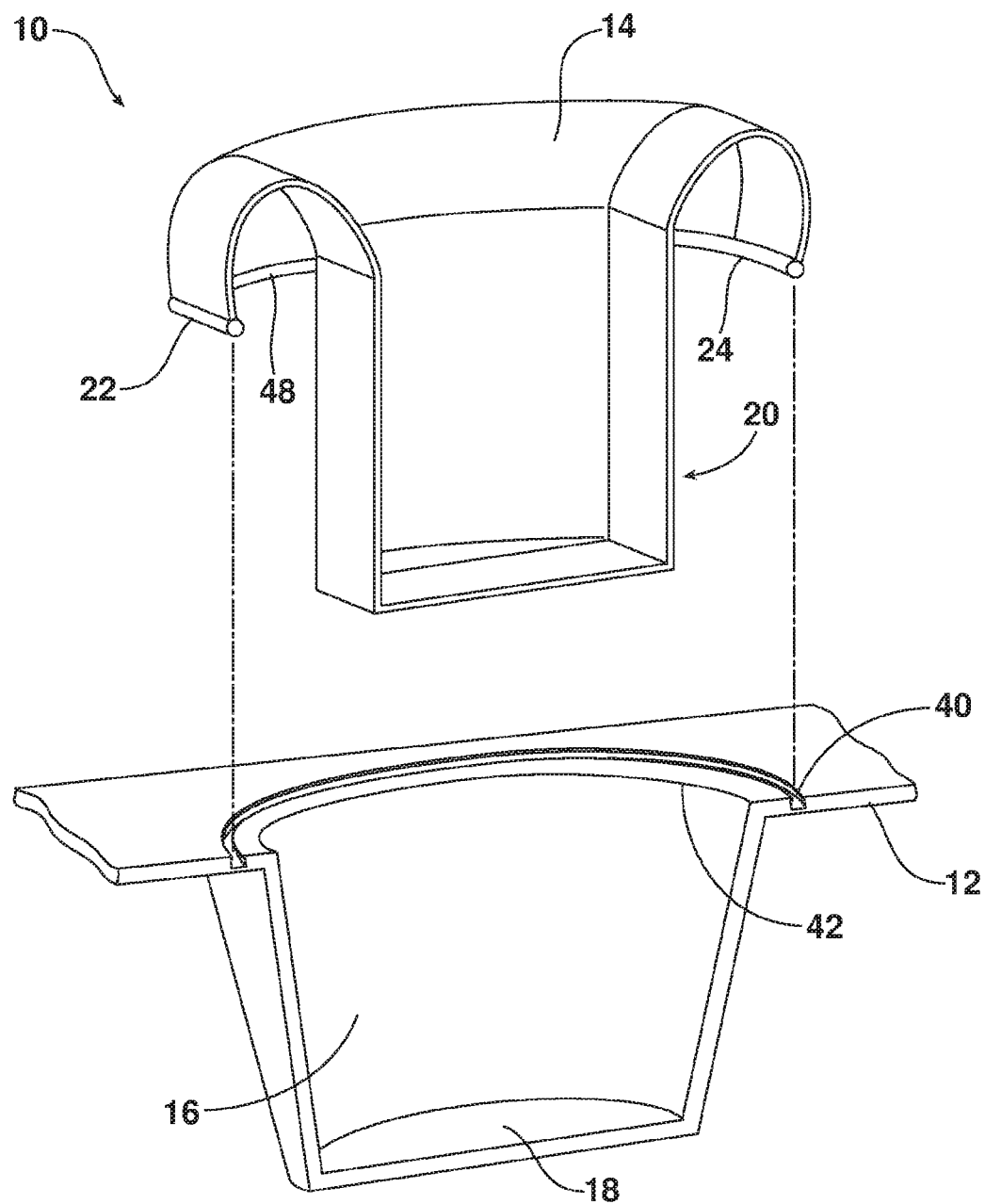
FIG. 5 illustrates how the flexible well may be easily removed from the housing of the cup holder assembly in order to allow for cleaning.

As should be appreciated from viewing FIG. 5, the flexible well 14, including the bottom 28 thereof may be made so as to provide a fully closed well that will catch and hold condensation on the side of the cup C or any spills within the confines of the flexible well 14. Advantageously, the flexible well 14 may be easily removed from the housing 12 for cleaning by simply snapping the edge of the well 14 including the ends 22, 24 of the integral spring 20 from the receiver/channel 40 and removing the flexible well 14 from the cavity 16 of the housing 12. After cleaning, the flexible well 14 may be snapped back into position by positioning the well 14 in the cavity 16 and aligning the beaded edge 48 thereof, including the first and second ends 22, 24 of the integral spring 20, with the receiver/channel 40 and snapping them into the channel.

As should be appreciated, the self-adjusting cup holder assembly 10 provides a number of benefits and advantages. The flexible well 14 is self-adjusting and the hinge points 30, 32 of the integral spring 20 function as opposed grippers to positively retain a cup C in position in the well 14. Further, when that cup C is lifted from the well 14, the integral spring 20, anchored at the pivot points formed by first and second ends 22, 24 of the spring 20 in engagement with the receiver/channel 40, biases the flexible well back to the original or rest position. Accordingly, the hinge points 30, 32 spread, pulling away from the sides of the cup and allowing the cup to be removed from the cup holder assembly 10 in an unrestricted manner.

As also noted, the biasing force provided by the integral spring 20 may be tuned to meet the requirements of any particular application. If the flexible well 14 and the integral spring 20 are made from the same flexible and resilient material, the spring 20 is made by increasing the thickness of the material to provide a stiffer zone. This may be designed for and allowed in the tool and is tunable based on width and thickness. In contrast, when two dissimilar materials are used for the flexible well 14 and for the integral spring 20 provided in the flexible well, then the materials are incorporated in one tool through a dual shot process. As also noted, the number of integral springs 20 can be varied around the periphery of the flexible well 14. Each integral spring 20 may also vary in width, thickness and shape to further tune the performance of the well 14 so as to provide the right amount of gripping force on an object held in a cup holder assembly 10.

The foregoing has been presented for purposes of illustration and description. It is not intended to be exhaustive or to limit the embodiments to the precise form disclosed. Obvious modifications and variations are possible in light of the above teachings. For example, in the illustrated embodiment, the open cavity 16 has a circular opening 42, the receiver/channel 40 is circular and the flexible well 14 is also circular. It should be appreciated that other shapes may be provided including triangular, rectangular, trapezoidal, pentagonal, or other polygonal shapes. All such modifications and variations are within the scope of the appended claims when interpreted in accordance with the breadth to which they are fairly, legally and equitably entitled.

What is claimed:

1. A self-adjusting cup holder assembly, comprising:
a housing including an open cavity having a circular opening and a channel extending concentrically around said circular opening; and
a flexible well held in said cavity, said flexible well being displaceable between a rest position and a cup holding position, wherein said flexible well includes an integral spring having a first end, a second end and a u-shaped intermediate section connecting the first end to the second end wherein at least the first or second end of said integral spring is held in said channel.

2. The self-adjusting cup holder assembly of claim 1, wherein said flexible well includes a closed end.

3. The self-adjusting cup holder assembly of claim 2, wherein the first end of said integral spring is held in said channel at a first point and the second end of said integral spring is held in said channel at a second point.

4. The self-adjusting cup holder assembly of claim 3, wherein said intermediate section extends along a bottom of said flexible well.

5. The self-adjusting cup holder assembly of claim 4, wherein said integral spring includes a first hinge point between said first end and said intermediate section and a second hinge point between point said intermediate section and said second end.

6. The self-adjusting cup holder assembly of claim 5, wherein said first hinge point is opposed to said second hinge point and a cup is positively squeezed between said first hinge point and said second hinge point when pressed down into said well.

7. The self-adjusting cup holder assembly of claim 6, wherein said integral spring includes a first arcuate section between said first end and said first hinge point.

8. The self-adjusting cup holder assembly of claim 7, wherein said integral spring includes a second arcuate section between said second end and said second hinge point.

9. The self-adjusting cup holder assembly of claim 8, further including a gap between said bottom of said flexible well and a bottom wall of said open cavity.

10. A self-adjusting cup holder assembly, comprising:
a housing including an open cavity; and
a flexible well held in said cavity, said flexible well being displaceable between a rest position and a cup holding position, wherein said flexible well includes an integral spring having a first end, a second end and a u-shaped intermediate section connecting the first end to the second end, wherein a portion of said intermediate section extends along a bottom of said flexible well, and wherein said integral spring includes a first hinge point between said first end and said intermediate section and a second hinge point between said intermediate section and said second end.

11. The self-adjusting cup holder assembly of claim 10, wherein said first hinge point is opposed to said second hinge point and a cup is positively squeezed between said first hinge point and said second hinge point when pressed down into said well.

12. The self-adjusting cup holder assembly of claim 11, wherein said integral spring includes a first arcuate section between said first end and said first hinge point.

13. The self-adjusting cup holder assembly of claim 12, wherein said integral spring includes a second arcuate section between said second end and said second hinge point.

14. The self-adjusting cup holder assembly of claim 13, further including a gap between said bottom of said flexible well and a bottom wall of said open cavity.

* * * * *